United States Patent [19]
Darley

[11] Patent Number: 5,170,371
[45] Date of Patent: Dec. 8, 1992

[54] METHOD AND APPARATUS FOR ROUNDING IN HIGH-SPEED MULTIPLIERS

[76] Inventor: Henry M. Darley, 122805 3713 Woodrail, Plano, Tex. 75075

[21] Appl. No.: 175,968

[22] Filed: Mar. 31, 1988

[51] Int. Cl.[5] .............................................. G06F 7/38
[52] U.S. Cl. ............................... 364/745; 364/715.03
[58] Field of Search .................... 364/745, 748, 715.03

[56] References Cited

U.S. PATENT DOCUMENTS

| | | | |
|---|---|---|---|
| 3,816,732 | 6/1974 | Jackson | 364/745 X |
| 4,293,922 | 10/1981 | Davio et al. | 364/757 |
| 4,495,593 | 1/1985 | Ware | 364/757 |
| 4,648,058 | 3/1987 | Masumoto | 364/745 |

OTHER PUBLICATIONS

Harata et al, "High speed multiplier using a redundant binary adder tree" in Proc. IEEE ICCD'84, Oct. 1984 (pp. 165-170).

Primary Examiner—Tan V. Mai

[57] ABSTRACT

A rounding circuit (10) for converting and rounding an M bit output from an adder array (12) into a N bit binary magnitude representation includes an incrementer (18) which increments the output of the adder array (12) prior to conversion. A borrow calculator (16) generates a select signal to a multiplexer indicating whether covnersion of the M bit number requires a borrow from the upper N bits. The select signal is used to choose between the incremented or non-incremented output. A converter/decrementer (22) converts the selected output of the multiplexer (20) into a binary magnitude number and also computes the magnitude representation decremented by one. A rounding circuitry (24) computes the rounding direction based on a control signal from control circuitry (26). The rounder circuit (10) calculates rounding information for two cases: (a) assuming that no normalization of the converted value is necessary and (b) assuming that normalization of the converted value is necessary. A selector/shifter (28) chooses between the decremented and non-decremented values based on the rounding information.

16 Claims, 1 Drawing Sheet

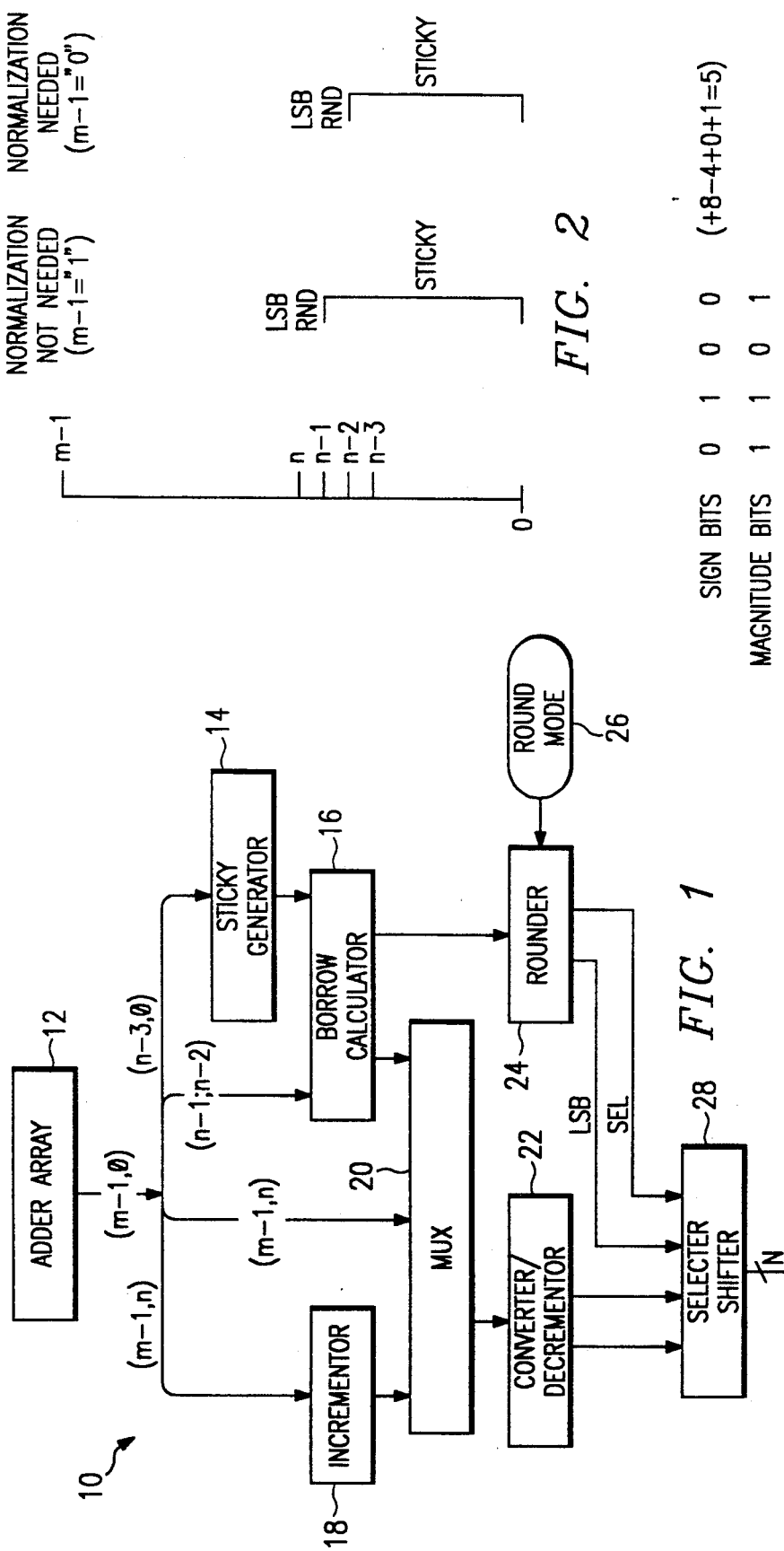

METHOD AND APPARATUS FOR ROUNDING IN HIGH-SPEED MULTIPLIERS

TECHNICAL FIELD OF THE INVENTION

This invention relates in general to integrated circuits, and more particularly to a high-speed circuit for rounding, converting and normalizing the output of an adder array.

BACKGROUND OF THE INVENTION

High-speed computation of floating point numbers is a critical design factor in many systems such as computers, signal processors and process controllers. Floating point representations of numbers are normally used in these systems because of the large dynamic range. Advanced technology makes it possible to fabricate an integrated circuit which can multiply floating point numbers using highly parallel techniques to improve speed.

Parallel array multipliers generate all partial products simultaneously and then add the partial products in an array of adders. The array of adders reduce the number of partial products to two numbers, often referred to as the sum stream and the carry stream. The sum and carry streams then are combined in a final adder to produce the product. The final addition requires about the same period of time as the addition of the partial products, because of the possibility of a low order bit resulting in a carry propagating to a much higher bit, called a carry chain. Thus, a pipeline register is often inserted between the adder array and the final adder.

Some multipliers use signed digit redundant number representation to take advantage of a tree approach to add the partial products in a parallel fashion while maintaining an iterative structure that increases circuit density and ease of layout. Signed digit representation uses two bits at each bit position to represent a 1, 0, or $-1$. Signed digit adders avoid long carry chains and the delays associated therewith. The signed digit adder array adds the partial products to a single signed digit number. However, since the signed digit representation is not a common format, it must be converted to conventional representation such as a binary magnitude representation. The conversion circuit is very similar to the final adder in the parallel array approach. Signed digit addition is explained in greater detail in Takagi, et al., *High Speed VLSI Multiplication Algorithm with a Redundant Binary Addition Tree*, IEEE Transactions on Computers, Vol. C-34, No. 9, September, 1985.

Further, in floating point multiplication, the product must be "normalized" such that the most significant bit is a "1". If the operand mantissas are N bits long, the resulting product mantissa is at most 2 N bits in length. To fit the original floating point format of an N bit length, the product is normalized and rounded. If the original mantissas are normalized, the normalization shift will be at most one bit. The rounding, however, may result in a carry propagating through the entire N bit number.

Thus, the multiplier must convert, normalize and round the final product. Typically, the conversion is performed first, since in signed digit representation it requires a long period of time to determine whether the leading bit of the equivalent magnitude number is a "0" or a "1" prior to conversion. Next, normalization is performed, since the normalization shift will determine which bit is rounded. Since both the conversion and the rounding may entail long carry chains, this approach significantly reduces the speed of the multiplication.

Therefore, a need has arisen for a method and apparatus for converting, normalizing and rounding a sum of partial products at a high speed.

SUMMARY OF THE INVENTION

In accordance with the present invention, a rounding circuit is provided which substantially eliminates or reduces the disadvantages and problems associated with prior rounding circuits.

The rounding circuit of the present invention generates an N bit binary magnitude representation of an M bit (typically 2N bit) output from an adder array by converting the M bit number into a binary magnitude representation while simultaneously calculating rounding information for the M bit number. Output circuitry forms the N bit magnitude representation based on the converted M bit number and the rounding information. The rounding information is calculated for two cases, the first case assuming no normalization of the converted value and the second case assuming normalization of the converted value.

The present invention provides the technical advantage of increased speed by simultaneously computing the rounding information along with the conversion of the output of the adder array. Speed is also increased by calculating rounding information for both normalization cases during the conversion.

In another aspect of the present invention, the rounding circuit includes incrementing circuitry for incrementing the most significant N bits of the adder array output by one prior to conversion, thereby providing for the situation where the rounding will cause an incremented number. By incrementing the output of the adder array prior to conversion, a long carry chain resulting in a time consuming add operation is avoided.

In yet another aspect of the present invention, borrow calculation circuitry for determining whether conversion of the entire output of the adder array will result in a borrow from the most significant N bits thereof is provided. Since the borrow calculation circuitry operates on the least significant bits of the adder array output, which are the first bits available, a decision of whether to choose the incremented or non-incremented value can be made prior to conversion, without additional time delay.

BRIEF DESCRIPTION OF THE DRAWINGS

For a more complete understanding of the present invention and the advantages thereof, reference is now made to the following descriptions taken in conjunction with the accompanying drawings in which:

FIG. 1 illustrates a block diagram of the rounding circuitry of the present invention;

FIG. 2 illustrates the output of adder array for the case where normalization of the final value is not necessary and for the case where normalization of the final value is necessary; and FIG. 3 illustrates conversion of a signed digit representation by subtraction of the negative magnitude bits from the positive magnitude bits.

DETAILED DESCRIPTION OF THE INVENTION

The preferred embodiment of the present invention is best understood by referring to FIGS. 1-3 of the drawings, like numerals being used for like and corresponding parts of the various drawings.

FIG. 1 illustrates a block diagram of the circuit to convert, normalize and round the final product (hereinafter, the "rounding circuit" 10). The rounding circuit 10 is connected to the output of the adder array 12, typically used to form the sum of the partial products. In the illustrated embodiment, a signed digit adder is assumed, with each "bit" of the output of the adder array represented by two bits, indicating a 1, 0, or $-1$ at each bit position. For N bit inputs, the output of the adder array of a multiplier will be 2N bits in length, comprising bits "0" to $2N-1$.

Bits "0" through $N-3$ are connected to a sticky bit generator 14. The output of the sticky bit generator 14 and bits $N-1$ and $N-2$ are connected to the borrow calculator 16. Bits N through $2N-1$ are connected to an incrementer 18. The output of the incrementer 18 and bits N through $2N-1$ are connected to a multiplexer 20, which is selected by an output from the borrow calculator 16. The output of the multiplexer is connected to a converter/decrementer 22. The borrow calculator 16 is also connected to a rounder 24. The rounder 24 is connected to control circuitry 26 which selects the desired rounding mode. The output of the converter/decrementer 22 and the output of the rounder 24 are connected to a selector/shifter 28. The converted, normalized and rounded product (the "final value") is available at the output of the selector/shifter 28.

In operation, the rounding circuit 10 obtains high speed by performing the rounding calculation in parallel with the conversion of the output of the adder array 12. Furthermore, the output of the adder array 12 is incremented prior to conversion, thereby allowing the increment to be performed in signed digit representation to avoid a long carry chain in the case of an upwards rounding operation.

The sticky bit generator 14 is best described in connection with FIG. 2 which illustrates the bits output from the adder array 12. The adder array 12 will output 2N bits, indexed as bit "0" through $2N-1$. The desired final value will be a normalized N bit result in binary magnitude representation. To normalize a floating point number, the bits are shifted until the most significant bit is a "1". If both inputs were normalized, the output will need at most one shift. Thus, if bit $2N-1$ equals a "1", the Nth bit will be the least significant bit of the normalized product, and the $N-1$ bit will be used for rounding purposes. For the purpose of this specification, bits "0" through $N-2$ are called the "remaining rounding bits" and are also used for rounding purposes.

If bit $2N-1$ equals a "0," then the most significant bit of the normalized output will be bit $2N-2$ and the least significant bit of the normalized output will be bit $N-1$. Consequently the rounding bit will be bit $N-2$ and the remaining rounding bits will comprise bits "0" through $N-3$.

If no normalization is needed, then the lower N bits will be rounded off; conversely, if normalization is needed, the lower $N-1$ bits will be rounded off. To implement the IEEE rounding standard 754, the round bit ($N-1$ or $N-2$, depending on whether normalization is necessary) must be known, as well as whether the remaining rounding bits have a positive, negative or zero value. The sticky bit generator 14 determines whether the remaining rounding bits (0 to $N-3$) have a positive, negative or zero value, and generates a "sticky bit" to so indicate. The value of the magnitude of the sticky bit is a "1", unless the magnitudes of the lower $N-3$ bits are all zero, in which case the magnitude of the sticky bit is "0". The value of the sign of the sticky bit is the value of the sign of the most significant non-zero magnitude bit of the lower $N-3$ bits unless all of the magnitude bits have a zero magnitude, in which case the sign bit is positive. In other words, the sticky bit is equal to the first non-zero bit (1 or $-1$) of the remaining bits, unless all of the remaining bits equal zero.

In performing the addition of the partial products, the lower order bits are determined before the upper order bits. Therefore, the sticky bit generation may be performed simultaneous with the generation of the upper order bits of the output of the adder array, thereby adding little or no delay to the calculation time.

The conversion from signed digit representation to a binary magnitude representation involves subtracting the negative digits of the output of the adder array from the positive digits output from the adder array. An example is given in FIG. 3 wherein a signed digit number having sign bits of "0100" and magnitude bits of "1101" may be converted to a binary magnitude number by subtracting the negative bits (the magnitude bits having a corresponding sign bit equal to one) from the positive bits (those bits having a sign bit equal to zero). In converting a 2N bit number, the upper N final value will be the direct conversion of the upper N signed digit numbers (assuming no normalization), except that the converted upper N bits may be incremented by "1" due to rounding of the lower bits, or be decremented by "1" if the conversion of the entire 2N bits would result in a borrow from the least significant bit of the N bit final value.

The rounding circuit 10 avoids the possibility of a long carry chain during the incrementing process by performing the increment of the upper N bits while still in signed digit representation. The increment is performed in the incrementer 18 without regard to whether an increment will be forced by the eventual rounding operation.

Simultaneously with the incrementing process, the borrow calculator 16 converts the bits of the adder output corresponding to bit positions N, $N-1$, and $N-2$, along with the sticky bit, into a magnitude representation and passes this number to the rounder 24. The borrow calculator 16 also calculates whether a borrow would occur between the lower N bits and the upper N bits were the conversion to be performed upon the entire 2N bit value from the adder array 12. If no borrow would occur, then the final value will be either the incremented value or the value of the upper N signed digits. If a borrow would occur, then the final value will be either the value of the upper N signed digit bits or a decremented value. The output of the borrow calculator 16 is used to select whether the incremented value or the non-incremented value will be passed through the multiplexer 20, the incremented value being passed if there will be no borrow and the non-incremented value passed if there will be a borrow.

The selected value is passed through the multiplexer 20 to the converter/decrementer 22. The converter/decrementer 22 generates both the converted value of the upper N bits and the same value decremented by one. The converter/decrementer 22 is a carry select subtracter which speeds up the subtraction by grouping the operands into blocks of a predetermined number of bits, performing the subtraction on each group of bits, Since the subtraction of any group of bits cannot be calculated until it is determined whether a borrow by the previous block is necessary (except for the first block), the carry select subtracter calculates both cases for each grouping, i.e., for the case where there is a borrow, the result of the subtraction is decremented by "1", and for the case where there is no borrow, the result of the subtraction is not decremented. When the lower block completes its calculation, the correct value for each subsequent group may be selected based on whether the previous group requires a borrow.

Normally, the least significant group of a carry select subtracter would not calculate both the decremented and non-decremented value, since there would be no borrowing from the first group. However, in the present invention, the carry select subtracter is designed such that the subtraction performed on the least significant group calculates both the decremented and non-decremented values. Therefore, both the decremented and non-decremented value for the entire N bit subtraction may be calculated with slight modifications to the hardware, and without a reduction in speed. Furthermore, the logic of the carry select subtracter may be simplified in the case of a signed digit conversion, since at any given bit position the magnitude of either the subtrahend bit or the minuend bit must be "0".

In parallel with the operation of the converter/decrementer 22, the rounder 24 is used to calculate the desired rounding calculation indicated by the input from the control circuitry 26. The rounding mode may be any type desired; the IEEE supports four rounding modes: round-up, round-down, round-to-the-nearest, and round-to-zero. The rounder 24 receives the converted bits o from the borrow calculator 16 corresponding to bits $N-1$ and $N-2$, and the sticky bit. Two cases of rounding are computed. In the first case, it is assumed that no normalization will be necessary, therefore the rounding is calculated on the converted bits corresponding to the sticky bit, $N-2$, and $N-1$. In case two, it is assumed that normalization will be necessary; therefore, the rounding is computed on the converted bits corresponding to the sticky bit and bit $N-2$, and the bit at $N-1$ is used as the initial least significant bit (LSB) for the final value. For each of the two cases, the rounder 24 sends an LSB and a select signal indicating whether the decremented or non-decremented output from the converter/decrementer 22 should be used.

For purposes of computing the rounding for case one, described above, if the rounding based on the bits corresponding to the sticky bit and bits $N-2$ and $N-1$ is up, then the select signal indicates that the non-decremented value from the converter/decrementer 22 should be used. If the rounding is not up, then the select signal indicates that the decremented output should be used. For case one, the LSB need not be calculated, since the output of the converter/decrementer 22 will contain the entire N bits.

In case two, the rounding is calculated on bits corresponding to the sticky bit and the bit at $N-2$ and an initial LSB is set to the bit at $N-1$. If the rounding is up and the initial LSB is set to 1, then the LSB output to the selector/shifter 28 is set equal to "0" and the select signal indicates that the non-decremented output should be used. If the round is not up and the initial LSB is set to "1", then the LSB sent to the selector/shifter 28 is set to "1" and the select signal indicates that the decremented output should be used. If the round is up and the LSB is set to "0", then the LSB sent to the selector/shifter is set to "1", and the select signal indicates that the decremented output should be used. If the rounding is not up and the initial LSB is set to "0", then the LSB output to the selector/shifter 28 is set to "0" and the select signal indicates that the decremented value should be used.

The derivation of the LSB and select outputs from the rounder 24, as described above, may be determined by the following equations:

$SEL_1 = RND$ $SEL_2 = RND$ AND $B(N-1)$ $LSB_2 = RND$ XOR $B(N-1)$ where
 $SEL_1$ = the select signal for case 1
 $SEL_2$ = the select signal for case 2
 $LSB_2$ = the LSB output for case 2
 RND = equals "1" if rounding up is to be performed and equals "0" otherwise.
 $B(N-1)$ = the value of the converted bits corresponding to bit position $N-1$. The SEL signals described by the equations above equal "1" if the non-decremented output is to be used and "0" if the decremented output is to be used.

The selector/shifter 28 selects either the decremented or non-decremented output of the converter/decrementer 22 and shifts accordingly based upon the select and LSB signals from the rounder 24 and the most significant bits of the decremented and non-decremented outputs of the converter/decrementer 22. If the most significant bits of both the decremented and non-decremented outputs of the converter/decrementer 22 are equal to "1", then no normalization is necessary. Thus, the selector/shifter 28 selects between the non-decremented and the decremented outputs based upon the $SEL_1$ signal, based on case 1. If the most significant bits of both the decremented and non-decremented outputs are equal to "0", then normalization will be necessary. In this case, the selector/shifter 28 chooses the $LSB_2$ and $SEL_2$ signals from the rounder 24 and performs a shift on the chosen output.

If the most significant bit of the non-decremented output is a "1" and the most significant bit of the decremented value is a "0", the selector/shifter 28 chooses the $SEL_2$ and $LSB_2$ signals from the rounder 24. However, in the instances that the $SEL_2$ signal indicates that the non-decremented output should be used, a shift is not performed, since the output is already normalized. Hence, the $LSB_2$ signal is not used in this case. In all other cases, the chosen output is shifted.

The rounding circuit of the present invention provides the technical advantage of increased speed, since the conversion of the output of the adder array is being performed simultaneously with the normalization and rounding. Whereas the rounding circuit of the present invention has been described in conjunction with a signed digit adder, it could be similarly used in connection with a Wallace-Tree structure where the final value must be converted from sum and carry streams.

Although the present invention has been described in detail, it should be understood that various changes, substitutions and alterations can be made herein without departing from the spirit and scope of the invention as defined by the appended claims.

What is claimed is:

1. A rounding circuit for converting and rounding an M bit output from an adder array into an N bit binary magnitude representation comprising:

conversion circuitry to convert predetermined portions of said M bit output into a binary magnitude representation;

rounding circuitry to calculate rounding information for said M bit output simultaneously with the converting of the portions of the M bit output; and output circuitry for forming the N bit magnitude representation, based on the outputs of said conversion circuitry and said rounding circuitry.

2. The rounding circuit of claim 1 wherein said rounding circuitry comprises:

circuitry to calculate said rounding information assuming no normalization of the converted M bit output is necessary; and circuitry to calculate said rounding information assuming normalization of the converted M bit output is necessary.

3. The rounding circuit of claim 2 wherein said circuitry to calculate rounding assuming normalization includes circuitry to calculate a least significant bit of the N bit binary magnitude representation.

4. The rounding circuit of claim 3 wherein said conversion circuitry generates a first value in which the most significant N bits of the adder array output are converted to magnitude representation assuming the rounding of the M bit magnitude representation does not result in a carry into the most significant N bits, and a second value in which the most significant N bits of the adder array output are converted to magnitude representation assuming the rounding of the M bit magnitude representation does result in a carry into the most significant N bits.

5. The rounding circuit of claim 4 wherein said output circuitry includes circuitry to detect whether normalization of said converted magnitude representation is necessary.

6. The rounding circuit of claim 5 wherein said output circuitry further includes shifting circuitry to normalize said converted magnitude representation.

7. The rounding circuit of claim 4 and further comprising incrementing circuitry for incrementing the output of the adder array prior to conversion to avoid carry chains due to rounding.

8. A rounding circuit for converting an M bit output of an adder array into a binary magnitude representation and rounding the output into a N bit number, comprising:

incrementing circuitry for incrementing the most significant N bits of the adder array output by one;

borrow calculation circuitry for determining whether conversion of the M bit output results in a borrow from the most significant N bits;

multiplexer circuitry for selecting an output between the most significant N bits of the adder array output and the incremented output based on the determination by said borrow calculation circuitry;

converter/decrementer circuitry for converting said selected output from the multiplexer circuitry into a binary magnitude number for calculating a decremented binary magnitude number;

rounding circuitry receiving an output of the borrow calculation circuitry for calculating the direction of a round of the adder array output; and selector circuitry receiving outputs of said converter/decrementer circuitry and said rounding circuitry for selecting between said decremented and non-decremented numbers calculated by said converter/decrementer based on the output of the rounding circuitry.

9. The rounding circuit of claim 8 and further comprising rounding converter circuitry for converting the lower M−N bits of the adder array output into a binary magnitude number, said rounding circuitry calculating the rounding direction based on said converted M−N bits.

10. The rounding circuit of claim 8 wherein the adder is a signed digit adder and further comprising:

circuitry to calculate a sticky bit equal to the most significant non-zero bit of the output of the adder array from bit position M−(N−3) to bit position zero, the sticky bit equal to zero if all of the bits equal zero; and circuitry for converting bits of the adder array output corresponding to bit positions M−(N−1), and M−(N−2), and said sticky bit, into a binary magnitude number, said rounding circuitry calculating the rounding direction based on said converted bits.

11. The rounding circuit of claim 8 wherein said converter/decrementer circuitry comprises a carry select subtracter.

12. The rounding circuit of claim 8 and further comprising circuitry for selectively shifting said number selected by said selector circuitry.

13. The rounding circuit of claim 12 and further comprising shift control means for determining whether a shift is necessary based on the most significant bits of said decremented and non-decremented numbers.

14. The rounding circuit of claim 13 wherein said rounding circuitry comprises circuitry to calculate a first rounding direction based on the M−N bits of the adder array output and a second rounding direction based on the M−(N−1) bits of the adder array output.

15. The rounding circuit of claim 14 wherein said rounding circuitry further comprises circuitry to calculate a least significant bit for the N bit output for the case where said shifting circuitry performs a shift.

16. The rounding circuit of claim 15 wherein said rounding circuitry further includes circuitry to output a first select signal based on said calculated first rounding direction and a second select signal based on said calculated second rounding direction and said calculated least significant bit.

* * * * *